Feb. 29, 1944.  J. F. VINCENT  2,343,117

HEAT SEAL AND EQUIPMENT THEREFOR, ETC

Filed Jan. 14, 1942

Inventor
Joseph F. Vincent

Attorney

Patented Feb. 29, 1944

2,343,117

UNITED STATES PATENT OFFICE 2,343,117

HEAT SEAL AND EQUIPMENT THEREFOR, ETC.

Joseph F. Vincent, Akron, Ohio, assignor to Wingfoot Corporation, Akron, Ohio, a corporation of Delaware Application January 14, 1942, Serial No. 426,791

7 Claims. (Cl. 154—42)

This invention relates to a new method of forming a heat-seal between two or more plies of a thermoplastic, heat-sealable film and includes the new heat-seal thus formed and equipment for forming it. Although the invention will be described more particularly as applied to the formation of a heat-seal between plies of rubber hydrochloride film, it applies also to the formation of a heat-seal between plies of other heat-sealable, thermoplastic films, such as films of the plasticized vinyl derivative known as Koroseal, cellulose acetate, cellulose ethers, etc.

Heat-seals formed by the equipment now usually employed compress the film at each edge of the heat-seal and thus weaken the film. This difficulty is overcome by the present invention. The heat-seal of this invention tapers off at one or both sides. This is accomplished by using a heating element having a sloping heating surface, or by using a heating element which is cooler at the edge than in the middle, or by using a device which combines the sloped surface with a heating element of non-uniform temperature.

Figure 1:
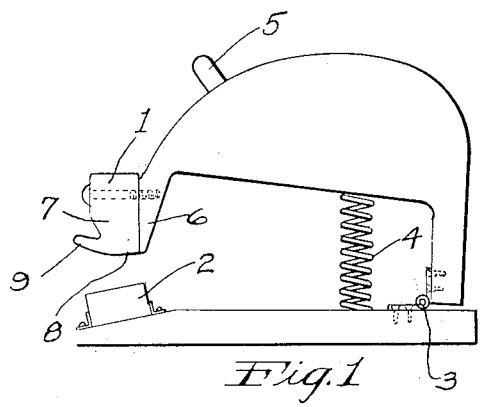
Figure 2:
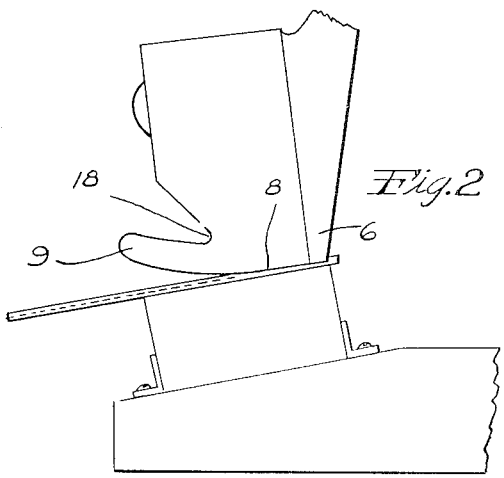
Figure 3:
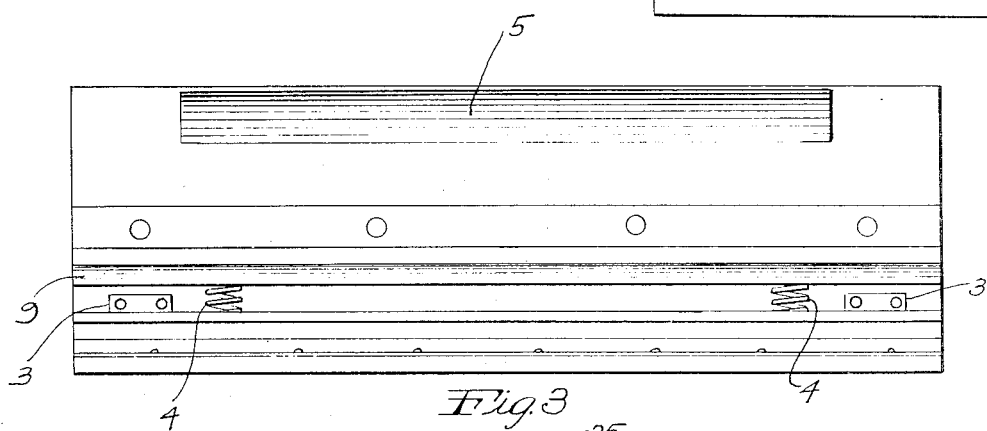
Figure 4:
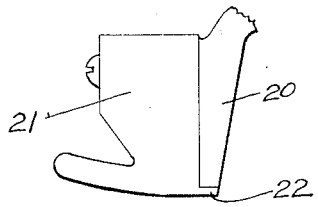
Figure 5:
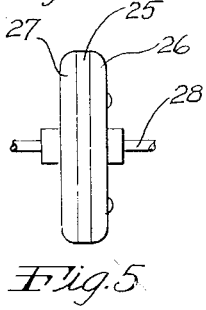
Figure 6:
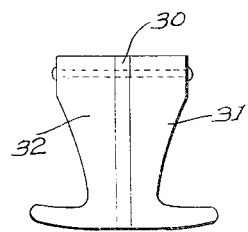

The invention will be further described in connection with the accompanying drawing in which Fig. 1 is an end view of a preferred heat-sealing device; Fig. 2 is an enlarged detail of the heat-sealing equipment; Fig. 3 is a front view of the device; Figs. 4, 5 and 6 are views of alternative equipment; and Fig. 7 is an enlarged view of two plies of film united by the device shown in Fig. 1.

The heat-sealing unit comprises the jaws 1 and 2, which are pivoted at 3 and are normally maintained in an open position by the spring 4. The handle 5 is provided for use in bringing the jaws together. The lower jaw 2 is a block of resilient material, for example, rubber. The upper jaw 1 is a composite jaw formed of the aluminum blade 6 and a block 7 of a composite material of low heat conductivity, such as Transite (an asbestos-cement molded product produced by the Johns-Manville Company) or other material of low heat conductivity, such as the compositions of high asbestos content which are familiar in the art. The blade 6 is heated by electrical resistance units, not shown.

The under surface of the jaw 1 is so shaped that the bottom of the blade 6 and the portion 8 of the block 7 adjacent the blade 6 form a plane parallel to the surface of the jaw 2 when the two jaws are brought together. The tip 9 of the Transite block does not contact the jaw 2, and the under surface of the upper jaw which unites the tip 9 with the portion 8 slopes away from the plane of the portion 8. As a result, instead of heating and softening the whole of that portion of the film to which pressure is applied in forming the seam, as is customary with the heat-sealing equipment now in use, only a small part of it is heated to the temperature at which it becomes very soft. Only a small area of the film is thinned out by the pressure of the jaws, and as shown in Fig. 2, this is the area near the edge of the film. At the other edge of the heat-seal there is no sharp line of demarcation between the portion of the film to which pressure has been applied and the portion to which no pressure has been applied. This is best shown by reference to Fig. 7.

Figure 7:
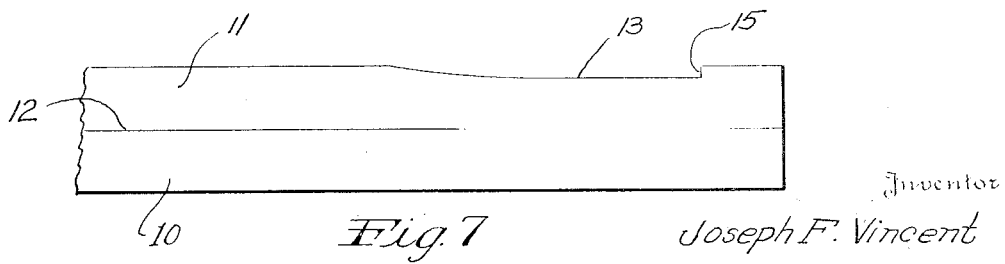

In Fig. 7 two plies of Pliofilm (rubber hydrochloride film) 10 and 11 are united by heat and pressure. The line 12 indicates the line of demarcation between the two plies of film. In the upper surface of the ply 11 there is a depression 13 made by the upper jaw 1 of the heat-sealing device shown in Figs. 1–3. The heated aluminum blade has formed the abrupt wall 15 at the side of the heat-seal near the edge of the films. But the opposite side of the depression gradually blends into the top surface of the film. There is no abrupt wall at this side of the depression such as is usual at both sides of the depression formed by the uniformly heated blade of the usual heat-sealing equipment. The abrupt wall 15, as shown in Fig. 7, is adjacent the edge of the two plies, and in this position is too near the edge of the films to be harmful. Such an abrupt wall along that side of a heat-seal depression which is adjacent the edges of the film ordinarily does no harm. However, an abrupt wall at the other side of such a depression materially weakens the bag or other structure.

Assume, for example, that the plies 10 and 11 are the front and back walls respectively of a bag. The heat-seal formed by the present equipment does not produce an abrupt edge at the inner wall of the depression, and there is, therefore, less tendency for a bag filled with liquid or a powdered or finely divided material, such as rice, etc., to burst along the heat-seal. It has been one of the objections to bags formed with the usual heat-sealing equipment that they are initially weak along this line. Such weakening is entirely eliminated in the bags of this invention. The abrupt wall 15 at the edge of the bag is not harmful. There is no natural tendency for the bag to flex at this point, and there is no extra strain along this line when the bag is dropped.

The heat-sealing device of the preferred form of this invention not only provides for gradually tapering off the pressure applied by the jaws, but the seal is also tapered by heating one or both of the jaws not uniformly. The portion of the jaw nearest the edge of the films is heated to the highest temperature. The aluminum blade 6 of the upper jaw is heated by an electrical resistance unit. This, in turn, raises the temperature of the Transite block 7. But this block is never heated to the temperature of the aluminum blade 6, and the Transite itself is not of a uniform temperature. The tip 9 is much cooler than the portion 8. The notch 18 aids radiation and lowers the temperature of the tip 9. There is a temperature gradient of at least 100° F., and preferably 250° F. or more between the tip 9 and the aluminum blade 6. The blade 6 may, for example, be heated to a temperature of about 400° F.

It is apparent that, using a heat-sealing blade which is hottest at the edge nearest the edge of the bag, the edge of the heat-seal depression nearest the edge of the bag will soften more readily than the opposite edge. A firm union is formed between the two plies at this edge of the seal. The gradual reduction in temperature toward the other edge of the seal is preferably such as to prevent the inner edge from softening to the point where it becomes thinner when pressure is applied in forming the seal. The portions of the two plies which are heated to the high temperature form a firm bond. With the temperature gradually fading off, it is not essential to have the jaws slope away from one another as illustrated in the drawing. However, the combination of both the graduated temperature and the sloping jaws is preferred.

Figs. 4, 5 and 6 show modifications of the device shown in Figs. 1-3. In Fig. 4 the aluminum blade 20 does not extend to the heat-sealing surface, but the Transite block 21 has a projection 22 which extends under the blade 20 so that the entire under surface of the upper jaw is composed of Transite. As the heated aluminum bar at times tends to adhere to heated Pliofilm, this construction may be preferred, as it eliminates any such tendency of the film to adhere to the blade.

Fig. 5 shows a heat-sealing roller. The middle portion 25 is composed of aluminum and is suitably heated by electrical resistance units (not shown). It is flanked on both sides by Transite discs 26 and 27. The shape of its circumference is such that as it is rolled along on its axis 28 in forming a heat-seal, it forms a depression with sloping walls at each side. The sloping circumferences of the discs 26 and 27 helps in this. No sharp depression is formed in the sealed film such as would weaken the film. If the heat-seal is formed along the edge of the films, as in the formation of a bag, etc., the disc may be omitted from the side of the roller nearest the film edge.

Fig. 6 is a modification of the jaw shown in Figs. 1 and 2. This jaw provides for elimination of any such sharp depression, such as that shown at 15 in Fig. 7. A heat-sealing jaw, such as that shown in Fig. 6 might well be used along the center seam of a bag. It comprises a heated aluminum plate 30 flanked on each side by Transite jaws 31 and 32. These jaws provide for gradual diminution of the temperature applied at each side of the jaw and also provide for a gradual reduction in the pressure at each side of the jaw.

There are numerous other possible adaptations of the invention.

What I claim is:

1. The method of heat sealing at least two plies of heat-sealable, thermoplastic film which comprises applying heat and pressure to one of the exposed surfaces of the film and applying greater pressure at one portion of the seam and gradually tapering off the pressure in at least one direction, whereby the depression formed in said exposed surface gradually tapers from the deepest portion of the depression to the surface of the film where there is no coalescence, thereby effecting a gradual blending of the plies whereby the compressed film retains its normal strength and resistance to rupture along the less compressed portion of the seam structure.

2. The method of heat sealing at least two plies of heat-sealable, thermoplastic film which comprises applying heat and pressure to one of the exposed surfaces of the film and heating a portion of the film at the edge of the area to which pressure is applied to a lower temperature than an adjacent portion of the area to which pressure is applied, whereby the plies are united with a gradual blending thereof from the area heated to said lesser temperature to the adjacent area where a higher temperature has been applied.

3. The method of heat sealing at least two plies of rubber hydrochloride film which comprises applying heat and pressure to one of the exposed surfaces of the film, thereby forming a depression therein by placing and maintaining at least one of the plies under compression, and applying less heat and pressure at an edge of the depression than at an adjoining area of the depression so that said edge of the plies remains of normal thickness.

4. A seam structure in more than one ply of heat-sealable, thermosplastic film, the films being united by coalescence due to heat and pressure, comprising a sharply compressed part in one of said films characterized by the exposed surface of one ply being depressed from the normal over the coalesced portion by the application of said pressure, and a gradually less compressed portion extending from the sharply compressed part and fading off to the normal thickness of the film characterized by the surface at one edge of the depression tapering up from the deepest portion thereof to the portion of the film where there is no coalescence and the film is of normal thickness, whereby the compressed film retains its normal strength and resistance to rupture along the less compressed portion of the seam structure.

5. A seam structure in more than one ply of heat-sealable, thermoplastic film, the films being united adjacent one edge thereof by coalescence due to heat and pressure, comprising a sharply compressed part in one of said films near the edge thereof characterized by the exposed surface of one ply being depressed from the normal over the coalesced portion by the application of said pressure, and a gradually less compressed portion extending from the sharply compressed part and fading off away from said edge to the normal thickness of the film characterized by the surface at one edge of the depression tapering up away from the deepest portion thereof to the portion of the film where there is no coalescence and the film is of normal thickness, whereby the compressed film retains its normal strength and resistance to rupture along the less compressed portion of the seam structure which is farther from the edge of the film than the deepest portion of the compressed area.

6. A seam structure in more than one ply of heat-sealable, thermoplastic film at the bottom of a bag, the plies being united by coalescence due to heat and pressure, said structure comprising a sharply compressed part in one of said films which is characterized by the exposed surface of one ply being depressed from the normal over the coalesced portion nearest the bottom of the bag by the application of said pressure, and a gradually less compressed portion extending from the sharply compressed part near the bottom edge of the bag and fading away to the normal thickness of the film characterized by the surface at one edge of the depression tapering away from the deepest portion thereof to the portion of the film where there is no coalescence and the film is of normal thickness, whereby the compressed film retains its normal strength and resistance to rupture along the less compressed portion of the film structure.

7. A seam structure in the bottom of a bag composed of rubber hydrochloride film, the seam being between overlapping plies of the film near the bottom of the bag, the plies being united by coalescence due to heat and pressure, comprising a sharply compressed part in one of said films characterized by the exposed surface of one ply near the bottom edge of the bag being depressed from the normal over the coalesced portion by the application of said pressure, and a gradually less compressed portion extending from the sharply compressed part near the bottom edge of the bag and fading off to the normal thickness of the film characterized by the surface at one edge of the depression tapering up from the deepest portion of the film to the portion where there is no coalescence and the film is of normal thickness, whereby the compressed film retains its normal strength and resistance to rupture along the less compressed portion of the seam structure.

JOSEPH F. VINCENT.